Patented Sept. 9, 1924.

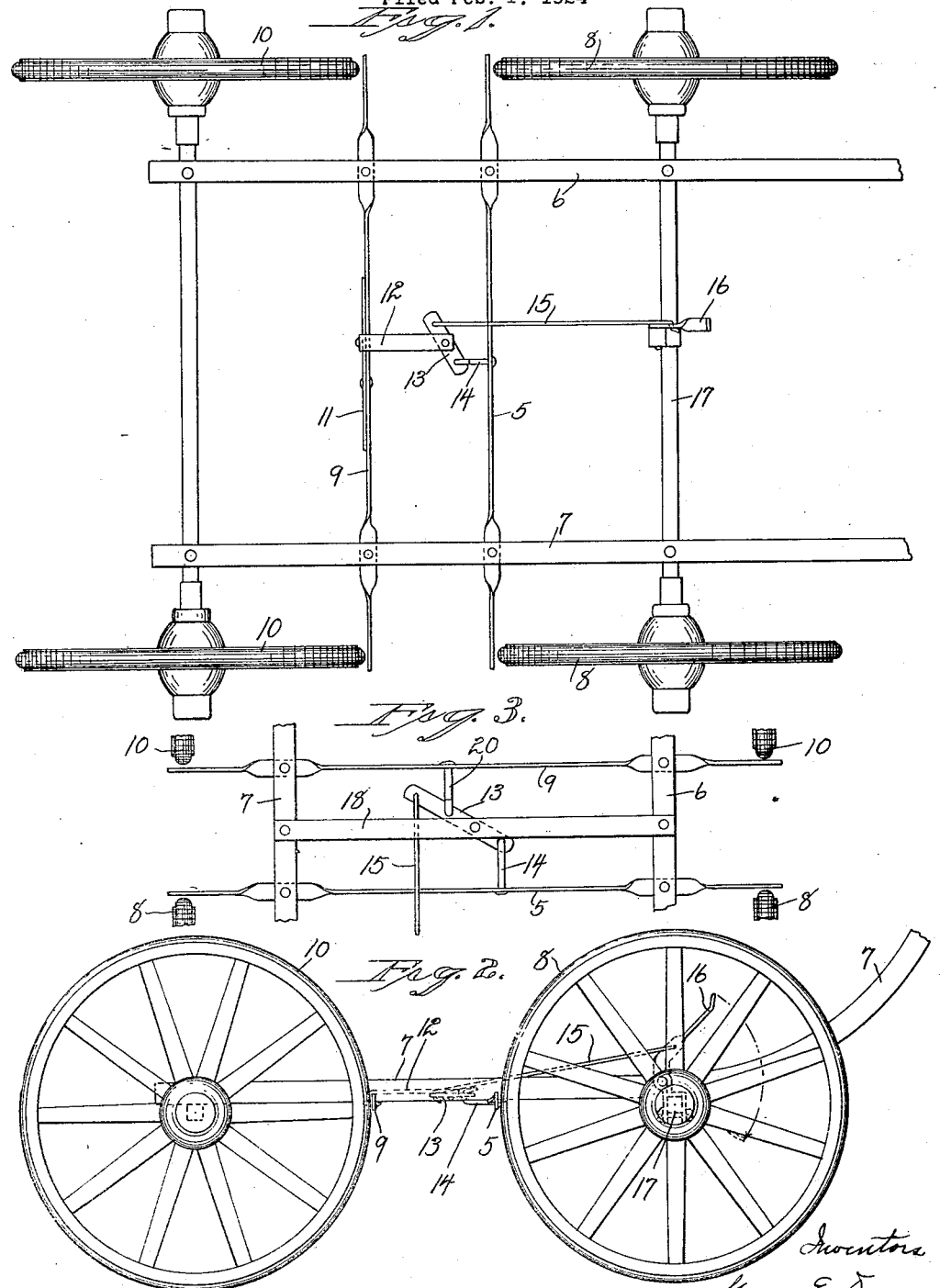

1,507,955

UNITED STATES PATENT OFFICE.

GEORGE E. DANN AND GEORGE S. GREENE, OF NEW HAVEN, CONNECTICUT, ASSIGNORS TO THE RATTAN MFG. CO., OF NEW HAVEN, CONNECTICUT, A CORPORATION.

BABY CARRIAGE.

Application filed February 1, 1924. Serial No. 689,860.

*To all whom it may concern:*

Be it known that we, GEORGE E. DANN and GEORGE S. GREENE, citizens of the United States, residing at New Haven, in the county of New Haven and State of Connecticut, have invented a new and useful Improvement in Baby Carriages; and we do hereby declare the following, when taken in connection with the accompanying drawings and the characters of reference marked thereon, to be a full, clear, and exact description of the same, and which said drawings constitute part of this application, and represent in—

Fig. 1 a plan view of the running-gear of a four-wheeled baby carriage constructed in accordance with our invention.

Fig. 2 a side view of the same.

Fig. 3 a broken plan view illustrating a modified form of our invention.

This invention relates to improvement in baby carriages, and particularly to brakes therefor. In four-wheeled baby carriages, brakes have sometimes been applied to the front wheels and sometimes applied to the rear wheels, such brakes usually being in the form of transversely-arranged bars which are adapted to be flexed, so as to engage with the tires of the wheels, but in case these rods or the ends thereof become bent, they will not engage with the wheels with sufficient force to firmly hold them against movement, and, consequently, a baby carriage left on an incline would not be safe. The object of this invention is to apply brakes to the four wheels of a baby carriage, and the invention consists in the construction as hereinafter described and particularly recited in the claims.

In carrying out our invention, we employ a rear brake 5 of substantially the usual construction, being connected to the side-bars 6 and 7 of the running-gear frame of the baby carriage, forward of the rear wheels 8. We also employ a similar brake-bar 9, also connected to the side-bars 6 and 7, and projecting in rear of the front wheels 10. Preferably and as shown, the front brake-bar 9 will be reinforced by a leaf 11 riveted thereto. Connected with the front brake-bar 9 is a rearwardly-extending arm 12, and pivotally connected with the rear end of this arm is a lever 13. One end of the lever is connected by a hook 14 or other device with the rear brake-bar 5, and the opposite end of the lever 13 is connected by a link 15 with a foot-lever 16 of usual construction, mounted on the rear axle 17.

A downward movement on the foot-lever 16 will draw the brake-bars toward each other, so as to force their ends against the rims of the four wheels and thus simultaneously apply the brakes thereto. In case the ends of either of the brake-bars should become bent, at least two of the ends would be active and hold the carriage against movement.

Instead of employing the rearwardly-extending arm 12, a transverse bar 18 might be secured to the side-bars 6 and 7, between the front brake-bar 9 and rear brake-bar 5, and the lever 13 pivoted to the bar 18, as shown in Fig. 3 of the drawings. In this construction, the brake-bars 5 and 9 will be connected with the lever 13 by hooks or links 14 and 20, and one end of the lever connected by a link 15 with the foot-lever 16, as before described. The operation in this construction will be the same as in that first described in that a movement of the foot-lever will apply brakes to the four wheels.

I claim:

1. In a baby carriage, the combination with the running-gear thereof, of two flexible brake-bars having their ends adapted to be engaged with the tires of the front and rear wheels, the forward brake-bar being provided with a reinforcing leaf, and means for simultaneously flexing the brake-bars, whereby their ends are moved into engagement with the rims of the wheels.

2. In a baby carriage, the combination with the running-gear thereof, including four wheels, a flexible brake-bar arranged in rear of the front wheels, and a flexible brake-bar arranged in front of the rear wheels, an arm rigidly connected with the front brake-bar and extending rearward therefrom, a lever pivotally mounted on the rear end of said arm, said lever connected at one side of its pivotal point with the rear brake-bar, a link connected with the opposite end of the said lever, and a cam foot-lever mounted on the rear axle and with which said link is connected whereby a downward movement of the lever will draw the brake-bars toward each other and force their ends into engagement with the tires of the wheels.

In testimony whereof, we have signed this specification in the presence of two subscribing witnesses.

GEO. E. DANN.
GEO. S. GREENE.

Witnesses:
J. VANGER,
ELEANOR E. CARLSON.